Jan. 5, 1960   J. TAREN   2,920,243
FIRE STARTER
Filed April 29, 1957
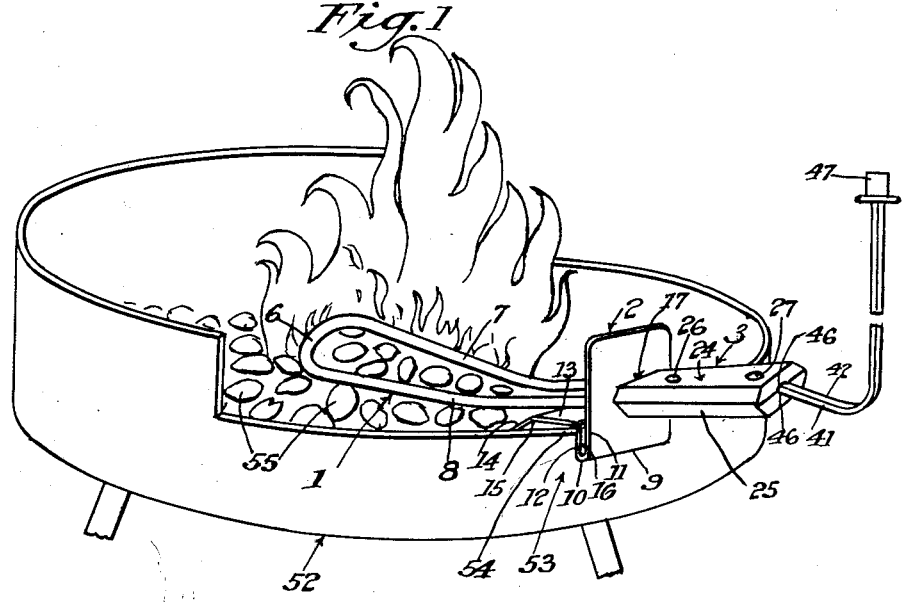
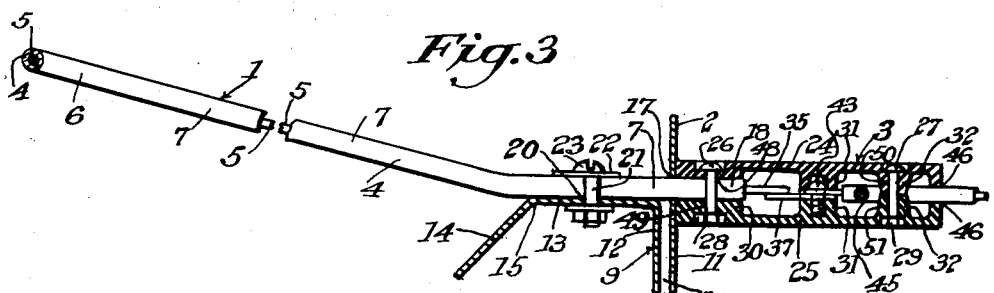
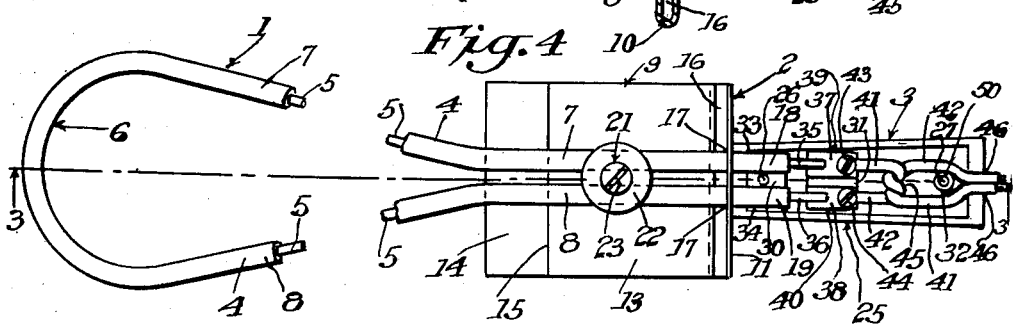
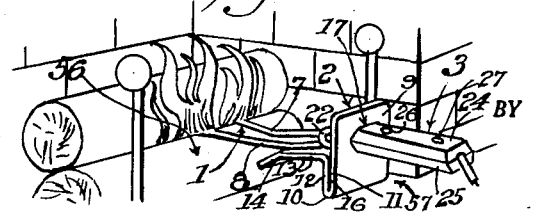
INVENTOR:
Jack Taren,
BY Alan Franklin,
ATTORNEY.

United States Patent Office 2,920,243
Patented Jan. 5, 1960

2,920,243

FIRE STARTER

Jack Taren, Los Angeles, Calif., assignor, by direct and mesne assignments, of one-half interest to Jack Taren, doing business as Jac-Tar Co., one-fourth to Don Kash, and one-fourth to Lou Kash, Los Angeles, Calif.

Application April 29, 1957, Serial No. 655,848

1 Claim. (Cl. 317—98)

This invention relates to a fire starter and more particularly to an electric, automatic, charcoal and log lighter.

The general object of my invention is to provide a fire starter of the character stated, which will light barbecue fires or logs, in a few minutes without expensive, evil-smelling chemicals, and which uses little electric current, or about ½¢ per barbecue or log lighting, and operates on 7¼ amperes.

A more particular object is to provide a fire starter of the character stated, constructed with a permanently attached heat shield and a burn-proof handle.

Other objects and advantages will appear hereinafter as this specification progresses.

My invention is illustrated in the annexed drawing forming a part of this specification, in which:

Fig. 1 is a perspective of my fire starter shown applied to a barbecue grill.

Fig. 2 is a perspective of my fire starter shown applied to a log heater.

Fig. 3 is a longitudinal section of my invention taken on line 3—3 of Fig. 4.

Fig. 4 is a plan view of my invention as shown in Fig. 3, with a portion of the heating element shown broken away.

Referring more particularly to the drawing, in which the same parts are designated by the same reference numerals in all of the views thereof, my invention includes primarily a heating element 1, a heat shield 2, over and through which the rear end of said heating element extends, and an insulating handle 3 detachably secured on the rear end of said heating element 1.

Said heating element 1 includes an outer tubular member 4 and a smaller conductor rod 5 extending through said outer tubular member 4. Said heating element is substantially U-shape in form, being bent horizontally transversely at its forward outer end into an arcuate connecting member 6, and bent rearwardly from the ends of said arcuate connecting member into a pair of spaced rearwardly extending side members 7 and 8, which side members are bent more closely together at the rear portions thereof.

Said heat shield 2 comprises a single piece of sheet metal 9 bent upwardly at bottom edge 10 into two spaced vertical walls 11 and 12, a horizontal wall or member 13 extending forwardly from said forward vertical wall 12, and an angular wall 14 spaced from the vertical walls 11 and 12 and bent downwardly from the forward end 15 of said horizontal wall at an angle of substantially 45 degrees to have its bottom edge parallel to bottom edge 10 in order to form a stable supporting base for the fire starter. The vertical wall 11 is bent upwardly from its connecting edge 10 to a height substantially over twice the height of the wall 12 and forming the rear wall of the shield 2. The vertical wall 12, which is spaced at 16 forwardly of the vertical wall 11, is bent upwardly from its connecting edge 10 upwardly to the rear end of the horizontal wall 13, which space 16 between said walls 11 and 12 forms an air gap. The rear vertical wall 11 is provided with an opening 17 midway between the side edges of said wall and immediately above the horizontal wall 13 through which opening 17 the rear ends 18 and 19 of the side members 7 and 8 of the heating element 1 are extended from the rear side of said rear wall 11 into the forward end of the insulating handle 3. The rear portions of the side members 7 and 8 of the heating element 1 are extended rearwardly over the horizontal wall 13 of the heat shield 2, midway between the side edges of said horizontal wall, and a screw opening 20 is provided in said horizontal wall 13 to receive the lower end of a screw bolt 21 extended downwardly between said side members 7 and 8 of the heating element 1 through a disc 22, engaging the upper sides of said side members 7 and 8 of said heating element, with the head 23 of said screw 21 engaging the upper side of said disc 22, whereby the rear portion of said heating element 1 is detachably clamped in position upon the horizontal wall 13 of the heat shield 2.

The handle 3 is formed of insulating material, preferably of Bakelite, in two longitudinal members 24 and 25, which are detachably secured together by two screw bolts 26 and 27 and nuts 28 and 29, with the forward end of said handle 3 secured on the outer rear ends 18 and 19 of the side members 7 and 8 of the heating element 1. The upper and lower members 24 and 25 of the handle 3 are hollow, but are formed with companion transverse embossments 30, 31 and conical embossments 32, respectively. The embossments 30 are formed in the inner end of the handle member 25 and is provided with longitudinal grooves 33, respectively, and 34, respectively, in which are received the rear ends 18 and 19 of the side members 7 and 8, respectively, of the heating element 1. The ends 35 and 36 of the inner conductor rod 5 extending through the outer tubular member 4 are secured to terminal plates 37 and 38, respectively, which rest in grooves 39 and 40, respectively, in embossments 31, to which plates are secured the inner ends of two insulated wires 41 and 42, respectively, by screws 43 and 44, respectively, which wires are twisted together at 45 between said embossments 31 and 32 and are extended from said twisted portions 45 rearwardly in said handle members 24 and 25 to opposite sides of said embossments 32 and are brought together rearwardly of said embossments 32 and extended together through registering grooves 46 in the rear end of the handle members 24 and 25 to an electric switch plug 47, providing a knot between said wires and said embossments, which prevents the handle 3 from being pulled off the rear end of the heating element 1.

The upper and lower handle members 24 and 25 are provided with companion apertures 48 and 49, and 50 and 51, respectively, through which apertures 48 and 49 extend the screw bolt 26, and through which apertures 50 and 51 extend the screw bolt 27 for detachably holding said handle members 24 and 25 together, as shown in Fig. 3 of the drawing.

In Fig. 1 of the drawing my fire starter is shown applied to a conventional charcoal barbecue grill 52 by slipping the forward vertical wall 12 of the shield 2 over the outer side of the narrow forward wall 53 of the grill with the horizontal wall 13 of my shield 2 resting upon the brazier edge 54 of said wall 53, with the heating element 1 resting upon the charcoal 55 in said grill and with the handle 3 extending outwardly from the shield 2.

In Fig. 2 my fire starter is shown with the lowermost edge wall 10 of the heat shield 2 resting upon the hearth and the heating element 1 resting upon the upper side of the forward log 56 of a log fireplace 57.

The operation of my invention is as follows:

With my fire starter applied to a barbecue grill as shown in Fig. 1 of the drawing, or applied to a log fireplace as shown in Fig. 2, the switch plug 47 is plugged into a switch socket (not shown) of a conventional commercial electric circuit, the heating element 1 is heated by the electric current passing therethrough until the charcoal in a barbecue grill or a log in a log fireplace is heated until combustion thereof takes place, whereupon a fire of said charcoal or log is started.

I claim:

A fire starter, adapted for use with and upon a conventional barbecue grill having a vertical grill wall, comprising, in combination: a heating element; a handle secured to said heating element at one end thereof, said element being extendable over said grill wall into said grill with said handle remaining outwardly with respect to said grill wall; and a vertical heat shield secured to said heating element and fittable over the upper edge of said grill wall and having a portion bent at its lower end into inner and outer vertical wall members with an air space therebetween, and a horizontal portion integral with said inner vertical wall member and adapted to extend inwardly over said grill wall from said inner vertical wall member.

References Cited in the file of this patent

UNITED STATES PATENTS

| | | |
|---|---|---|
| 1,609,920 | Whited | Dec. 7, 1926 |
| 1,618,444 | Kuhn et al. | Feb. 22, 1927 |
| 1,631,514 | Brush et al. | June 7, 1927 |
| 1,912,302 | Pfeffer | May 30, 1933 |
| 1,921,254 | Hammeral | Aug. 8, 1933 |
| 1,988,827 | Bennett | Jan. 22, 1935 |
| 2,246,719 | Burnham | June 24, 1941 |
| 2,514,618 | Ancell | July 11, 1950 |
| 2,540,277 | Molotzak | Feb. 6, 1951 |
| 2,541,214 | Davis | Feb. 13, 1951 |
| 2,721,251 | Thomas | Oct. 18, 1955 |
| 2,751,484 | Moon | June 19, 1956 |
| 2,841,683 | Ogle et al. | July 1, 1958 |

FOREIGN PATENTS

| | | |
|---|---|---|
| 533,742 | Great Britain | Feb. 17, 1941 |
| 920,762 | France | Jan. 4, 1947 |